United States Patent [19]
Theodorides

[11] 3,834,658
[45] Sept. 10, 1974

[54] OUTLET BOX WITH ADJUSTABLE MOUNTING

[76] Inventor: Panos C. Theodorides, 595 River St., Mattapan, Mass. 02126

[22] Filed: May 18, 1973

[21] Appl. No.: 361,398

Related U.S. Application Data

[63] Continuation-in-part of Ser. No. 227,772, Feb. 22, 1972, abandoned.

[52] U.S. Cl. .......... 248/205 R, 220/3.9, 248/DIG. 6
[51] Int. Cl. ........................... H02g 3/08, F16b 2/24
[58] Field of Search .......... 248/205 R, 216, DIG. 6, 248/27; 220/3.9, 3.3, 3.2, 3.7, 3.92

[56] References Cited
UNITED STATES PATENTS

| | | | |
|---|---|---|---|
| 989,854 | 4/1911 | Kruse | 220/3.9 |
| 1,026,164 | 5/1912 | Hoffman | 248/DIG. 6 |
| 1,265,744 | 5/1918 | Canfield | 248/DIG. 6 |
| 1,718,878 | 6/1929 | Raquette | 248/DIG. 6 |
| 1,982,957 | 12/1934 | Knell | 220/3.9 |
| 2,233,548 | 3/1941 | Mroziak | 220/3.9 X |
| 2,644,600 | 7/1953 | Senif | 220/3.9 |
| 3,127,145 | 3/1964 | McGintz et al. | 248/216 |
| 3,365,156 | 1/1968 | Beck | 220/3.9 X |

*Primary Examiner*—J. Franklin Foss
*Attorney, Agent, or Firm*—Wolf, Greenfield & Sacks

[57] ABSTRACT

An electrical outlet box assembly comprising in combination a box and bracket slidable on a side wall of the box and adapted to be secured to a wall stud. A screw carried by the bracket registers with a threaded opening on the side wall. When turned the screw causes the box to move on the bracket either in or out with respect to the wall surface.

3 Claims, 7 Drawing Figures

PATENTED SEP 10 1974　　3,834,658

OUTLET BOX WITH ADJUSTABLE MOUNTING

This application is a continuation-in-part of my copending U.S. patent application Ser. No. 227,772 filed Feb. 22, 1972 now abandoned.

BACKGROUND OF THE INVENTION

This invention relates to electrical outlet boxes and more particularly comprises an outlet box assembly designed for new construction, which enables the box to be moved in or out with respect to the wall surface.

Electrical outlet boxes which are used to house switches, receptacles, etc., have an open face which normally lies flush with the surface of the wall in which the box is placed. These boxes in new construction are normally nailed to the studs and wired before the dry wall or lath and plaster are applied to the studs. Conventionally these boxes include no means for adjusting their position with respect to the wall surface after the dry wall or lath and plaster have been applied, and therefore if the boxes are not installed initially in just the proper position, problems are subsequently encountered during finish work in the structure.

Some adjustable devices have been developed such as is shown in Senif U.S. Pat. No. 2,644,600, but none have met with any significant acceptance. The Senif device while providing means for adjusting the position of the box, is very difficult to use because when the wiring is installed in the box the adjusting means is not readily accessible. This problem is typical of those encountered in the prior art.

One important object of this invention is to provide an adjusting means for an electrical outlet box mounting, which is readily accessible even when the box is wired. It is essential that the means be accessible even when the box is wired, for the wiring normally is installed before the dry wall or lath and plaster are applied. Consequently any adjustments to be made will in fact be made after wiring.

Another important object of this invention is to provide a box assembly having an adjustable bracket which does not appreciably add to the cost of the box.

To accomplish these and other objects, the box of this invention includes a bracket which is slidable on a side wall of the box and which is adjusted by means of a screw disposed outside the box interior. By turning the screw, the box is moved either into or out of the wall so as to enable the builder to position the box face in the plane of the wall.

BRIEF FIGURE DESCRIPTION

DETAILED DESCRIPTION

Figure 1:
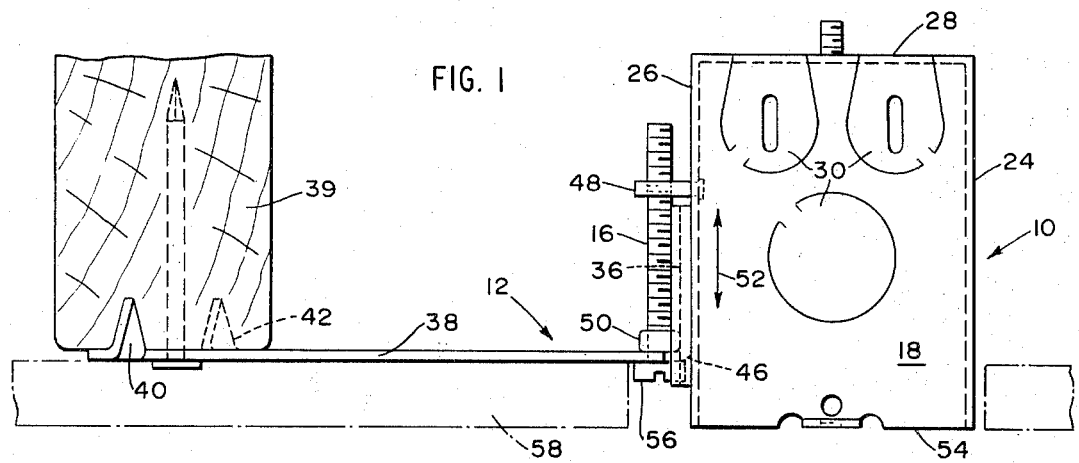
FIG. 1 is a top view of the outlet box and molding of this invention shown secured to a wall stud.
Figure 2:
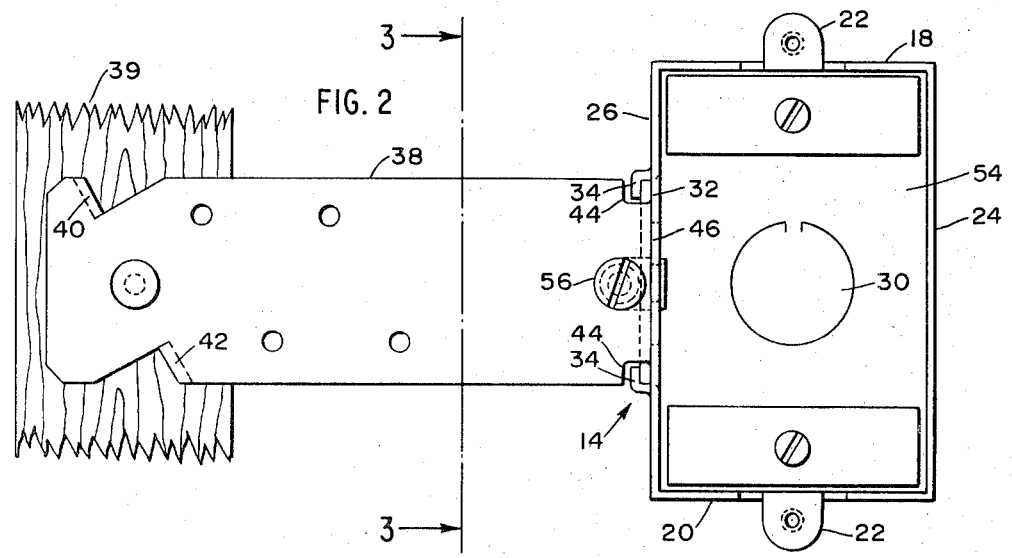
FIG. 2 is a front view of the assembly shown in FIG. 1.
Figure 4:
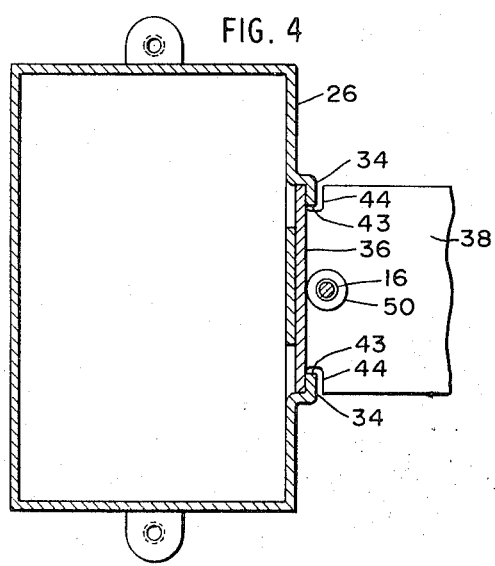
FIG. 4 is a rear view of the outlet box and molding.
Figure 3:
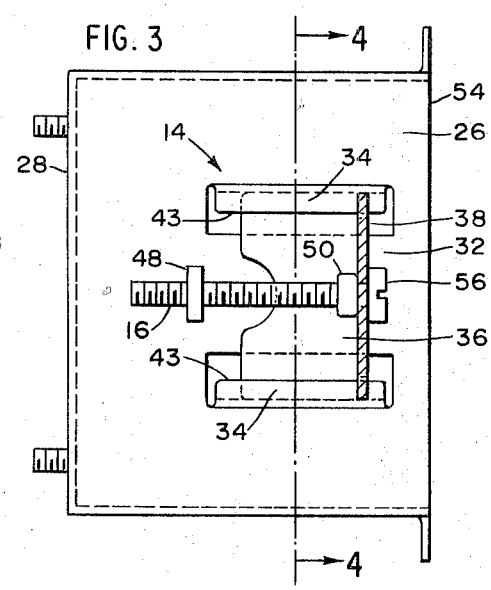
FIG. 3 is a cross sectional view taken on the section line 3—3 of FIG. 2.

The assembly shown in FIGS. 1–4 of the drawing includes an electrical outlet box 10 and bracket 12 slidably secured to one another by slide assembly 14. An adjusting screw 16 operates the slide assembly 14.

Box 10 is of generally conventional design and includes top and bottom walls 18 and 20 bearing lugs 22, side walls 24 and 26, and rear wall 28. The various walls are provided with conventional knockouts 30, the details of which form no part of the present invention.

Side wall 26 is formed with a slot 32 that forms part of the assembly 14. The slot includes a pair of ears 34 integral with and bent out of the plane of the side wall. The ears extend horizontally parallel to one another so as to form the slot which receives plate 36 that forms part of bracket 12.

Bracket 12 includes an arm 38 perpendicular to the plate 36 and side wall 26, which arm is designed to be mailed to a stud 39 of the wall on which the box is to be mounted. A pair of triangular barbs 40 and nail holes 42 are formed in arm 38 to facilitate anchoring the bracket to the stud.

Plate 36 which is somewhat greater than the space between the opposed edges 43 of ears 34 so that the plate is confined in the slot and the box may not be accidentally pulled from it. Arm 38 is notched at 44 at bend 46 where the plate and arm join one another to further stabilize the box on the bracket.

A nut 48 is secured to the outside of wall 26 of box 10 adjacent the rear ends of ears 34 and receives adjusting screw 16 which is rotatably carried on arm 38. The screw 16 retained on the arm by a collar 50 so that the screw is free to rotate with respect to the arm but it may not move axially with respect thereto. Therefore, when adjusting screw 16 is rotated, bracket 12 is drawn along the slot 32 so as to move the box 10 front or back as suggested by arrow 52. In this way the open face 54 of box 10 may be positioned in precisely the desired plane. It is evident from an examination of the drawings that any wiring, etc., disposed in box 10 will in no way interfere with or inhibit access to the screw head 56 so that the adjustment may be readily made even after the wiring is installed. It will be appreciated that the assembly thus enables the builder after the dry wall or lath has been mounted, to move the box in or out of the wall so that the face 54 is flush with the wall surface.

Figure 5:
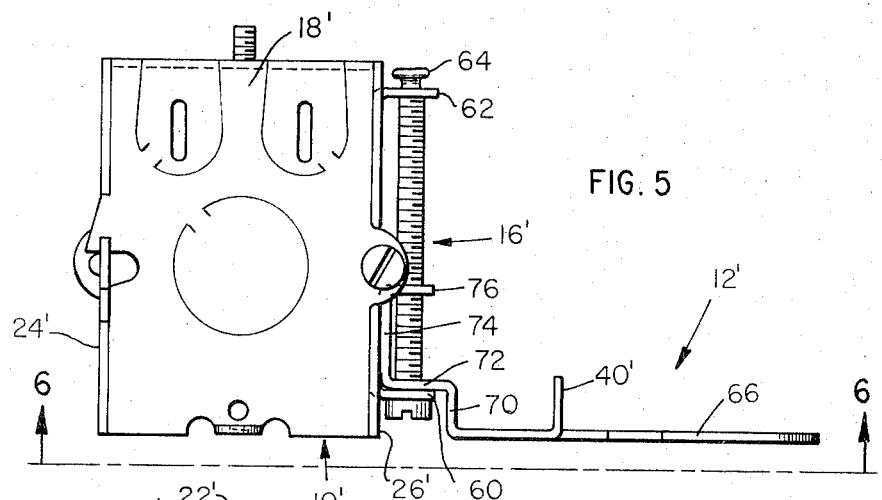
FIG. 5 is a plan view of a modified form of the outlet box and bracket.
Figure 6:
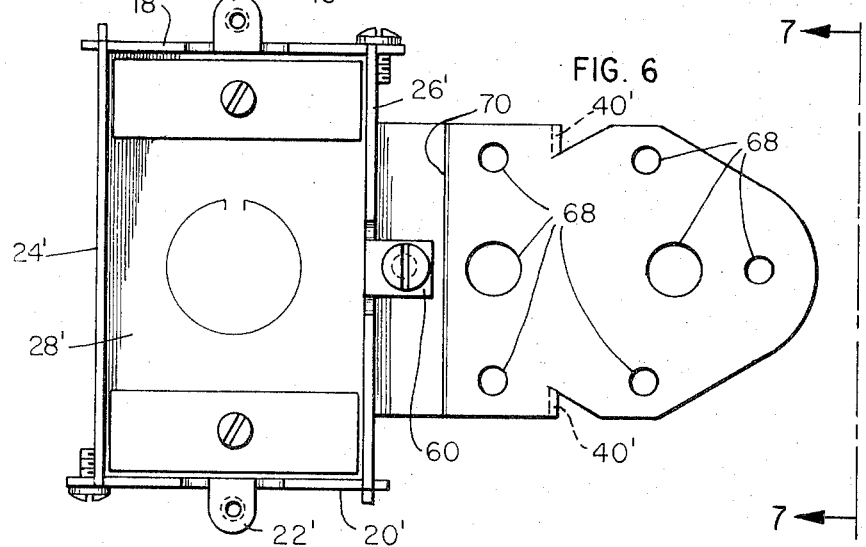
FIG. 6 is a front elevation of the outlet box and bracket as seen from the lines 6—6 of FIG. 5.
Figure 7:
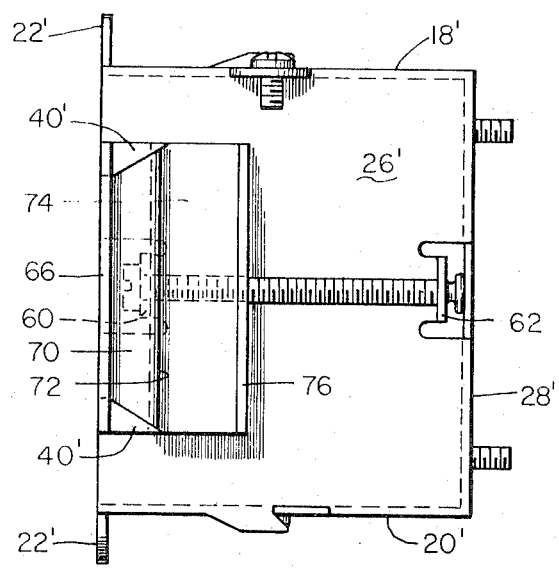
FIG. 7 is a side elevation of the outlet box and bracket as seen along the line 7—7 of FIG. 6.

FIGS. 5–7 shown a modified embodiment of the invention. As in the previously described embodiment, there is an outlet box 10' and an associated bracket 12' which are movably mounted with respect to each other as controlled by the adjusting screw 16'. The box 10' includes top and bottom walls 18', 20', side walls 24' and 26', a rear wall 28' and bearing lugs 22'. In this embodiment, however, the bracket 12' and the manner in which it is adjustably mounted to the outlet box 10' has been modified. As shown in FIGS. 5–7, the front and rear ends of the side wall 26' are formed to define a pair of spaced tabs 60, 62 which are punched out from the side wall 26' and which have aligned holes formed therethrough to rotatably receive the opposite ends of the adjusting screw 16'. The forwardly facing end of the screw is disposed forwardly of the tab 60 to provide access and the rearward end of the screw is swagged or otherwise provided with an enlarged end 64 to retain the screw 16' rotatably in the tabs 60, 62. The screw 16' is mounted as to be spaced somewhat from the sidewall 26'.

The bracket 12' includes a laterally extending arm 66 having appropriate holes 68 formed therethrough to enable the outer end of the arm 66 to be fastened securely to a selected stud in the wall as is the previously described embodiment. The arm 66 preferably also includes a number of triangular barbs 40' to further enhance fastening of the unit to the stud. The inner end of the bracket 12' is formed to define a number of walls including, in succession, the rearwardly extending standoff 70, the laterally extending wall segment 72, the rearwardly extending wall segment 74 and the reverted wall segment 76. The wall segments 72, 74 and 76 define a U-shaped channel with the segments 72, 76 having holes formed therethrough to receive the screw 16''. The more forward of the segments 72 has internal threads engaged by the screw 16' whereas the hole in the more rearward segment 76 has a slightly enlarged, unthreaded hole to permit free rotation of the screw therein. The segment 74 which is located between the screw 16' and the side wall 26' of the box extends heightwise along a substantial portion of the side wall 26' and slides along the side wall. The cooperation between the facing surfaces of the segment 74 and side wall 26' and the engagement of the screw 16' with the holes in the segments 72, 76 stabilize the bracket 12' with respect to the outlet box 10' to minimize any looseness or play between the two. By rotating the screw 16', the outlet box 10' can be advanced to its most forward position shown in FIG. 5 in which the segment 72 is in abutment with the tab 60 and a rearward position in which the segment 76 is in abutment with the rearward tab 62. It should be noted that, preferably, the standoff 70 is dimensioned so that when the box 10' is in its most forward position, the forward edge of the box will lie in or very close to the same plane as the outer end 66 of the bracket 12'.

This latter embodiment of my invention provides some of the advantageous features of the first described embodiment in that it permits the open face of the box 10' to be positioned easily and without interference with the wires which have already been introduced into the box 10'. In addition, the latter embodiment provides an easily manufactured structure having relatively few additional cutout portions and which maintain the outlet box and bracket relatively rigid with respect to each other.

Having thus described this invention in detail, those skilled in the art will appreciate that modifications may be made thereof without departing from the spirit of the invention. Therefore it is not intended to limit the breadth of this invention to the specific embodiment illustrated and described. Rather, the scope of this invention is to be determined by the appended claims and their equivalents.

What is claimed is:

1. An outlet box assembly comprising
walls defining an outlet box,
a bracket movably supported to the exterior of one wall of the box and having an arm extending from the box, which arm is constructed and arranged to be secured to a stud in a wall in which the assembly is to be installed,
said bracket being mounted for movement by means wholly exterior of said outlet whereby said outlet box is substantially free of inwardly extending projections from said mounting means,
a drive screw lying wholly outside the interior of the box,
said drive screw being mounted at its ends to a pair of spaced lugs extending outwardly from a side wall of said outlet box, and being freely rotatable within said lugs along an axis spaced from and paralleling said side wall,
said end of said bracket which is adjacent said outlet box including a member disposed between said screw supporting lugs, said member receiving said screw therethrough and threaded engagement therewith whereby rotation of said screw may permit relative movement of said outlet box and said bracket, said member including a surface oriented substantially parallel to and in sliding engagement with said side wall of said outlet box, said movement between said outlet box and said bracket being limited by engagement with said member with said lugs.

2. An outlet box assembly as defined in claim 1 further characterized by
said member at the inner end of said bracket being formed from a single piece of sheet metal integral with said arm and defining a U-shaped channel having a bottom wall and a pair of upstanding flanges, said bottom wall comprising that portion of said member which bears slidably against said side wall of said outlet box,
and each of said flanges having a hole formed therethrough to receive said screw, one of said holes being threadable engaged with said screw and the other of said holes being larger than said screw to permit free rotation of said screw therethrough.

3. An outlet box assembly as described in claim 2 further characterized by
the more forward of said flanges being offset rearwardly from the plane of said arm of said bracket by a connecting wall, said connecting wall and the outwardly extending arm portion of said bracket defining a corner region adapted to fit against the corner of the wall stud to which said arm is secured.

* * * * *